July 24, 1962   A. S. PAGE   3,046,036
VEHICLE RUNNING GEAR ASSEMBLY FOR TANDEM AXLE SUSPENSION
Filed Nov. 14, 1960
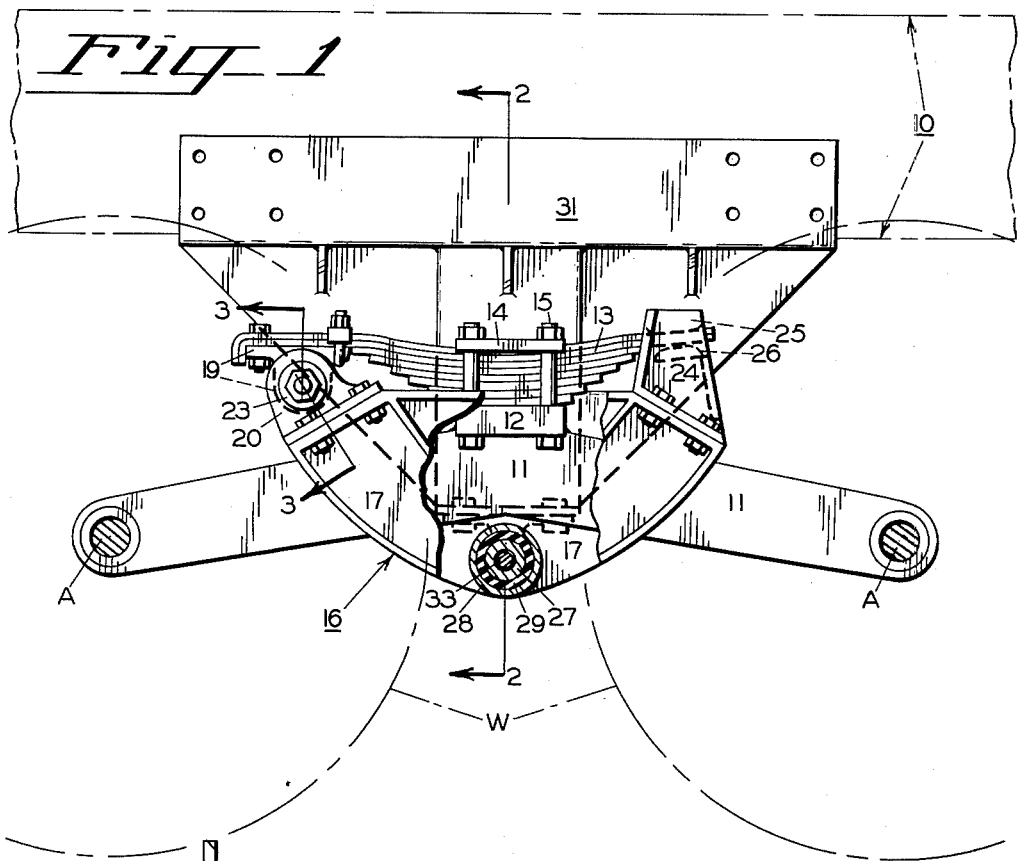
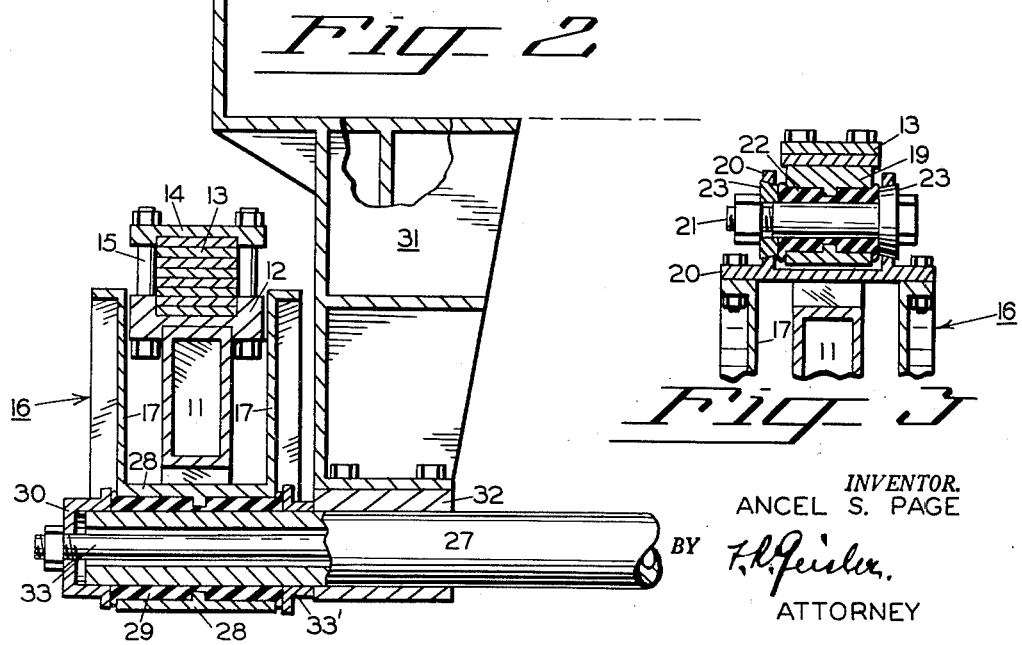
INVENTOR.
ANCEL S. PAGE
ATTORNEY

United States Patent Office 3,046,036
Patented July 24, 1962

3,046,036
VEHICLE RUNNING GEAR ASSEMBLY FOR TANDEM AXLE SUSPENSION
Ancel S. Page, Portland, Oreg., assignor to Dura Corporation, Oak Park, Mich., a corporation of Michigan
Filed Nov. 14, 1960, Ser. No. 68,960
3 Claims. (Cl. 280—104.5)

This invention relates to dual or tandem axle vehicle suspension in which the dual axles are carried at the respective ends of a pair of walking beams mounted at opposite sides of the vehicle.

More specifically, the present invention is concerned with such tandem axle suspension wherein the walking beams are connected with the vehicle frame or chassis through the combined intermediary of a transversely-extending trunnion shaft and suitable spring means.

Heretofore it has been the practice to a very large extent in tandem axle suspensions of this general type to have the walking beams pivotally mounted on the respective ends of a trunnion shaft and to have the vehicle frame directly supported on such trunnion shafts by means of leaf springs. This customary suspension necessitates the use of relatively large leaf springs and involves such problems for large springs employed in this manner as cost, maintenance, and proper protection against excessive strain. Also with such suspension the shocks received by the walking beams are transmitted directly to the trunnion shaft on which the vehicle frame is supported, a portion of such shocks then being absorbed by the leaf springs as the shocks are transmitted from the trunnion shaft to the vehicle frame.

I have found that much more satisfactory shock absorption is obtainable through the medium of an improved vehicle suspension construction in which an indirect connection between the walking beams and trunnion shaft is employed in place of the above mentioned direct connection, and furthermore I have found that, with this improved construction, smaller leaf springs are required than heretofore considered necessary in tandem axle suspension.

The object of the present invention is to provide an improved running gear assembly for tandem axle suspension in which greater absorption of shocks takes place in the transmission of the shocks from the walking beams to the vehicle frame.

Another object of the invention is to provide an improved vehicle suspension construction in which smaller leaf springs can be employed in place of the larger leaf springs heretofore required, without any sacrifice in shock absorption, thus having the advantage of the saving in cost and maintenance possible with the use of smaller leaf springs as compared to larger leaf springs.

A further specific object of the invention is to provide an improved tandem axle suspension in which the trunnion shaft on which the vehicle frame is supported will in turn be supported from the walking beams by a resilient suspension, instead of being directly carried on the walking beams.

The manner in which these objects and other incidental advantages are attained with the present invention, and the manner in which the improved suspension embodying the invention is constructed, will be readily understood from the following brief description and explanation with reference to the accompanying drawings.

In the drawings:

FIG. 1 is a side elevation of the improved tandem axle suspension assembly, with portion of this assembly broken away for clarity;

FIG. 2 is a fragmentary section on line 2—2 of FIG. 1 drawn to a larger scale; and FIG. 3 is a fragmentary section on line 3—3 of FIG. 1 drawn to the same scale as FIG. 2.

Referring first to FIG. 1, a portion of the vehicle frame is indicated by the broken lines at 10, the near side wheels being indicated by the broken lines W, and the tandem axles being indicated at A. The two axles are secured in their respective ends to a pair of walking beams, located on the opposite sides of the vehicle, the near side walking beam being shown at 11 in FIG. 1. Although only one walking beam and the suspension means connected with such walking beam are shown in the drawings, it is to be understood throughout this description that the suspension means is the same on each side of the vehicle. Thus it will suffice to describe the suspension means on one side only, as illustrated in the drawings.

Each walking beam 11 has a saddle 12 at the top of the center portion, and a leaf spring 13 is clamped at its center to the saddle 12 by the usual clamping means consisting of a top clamping plate 14 and clamping bolts 15 (see also FIG. 2). A composite hanger-bracket (or trunnion mount) 16 depends from each leaf spring 13, being connected with the ends of the leaf spring as presently explained. This composite bracket 16 is substantially U-shaped in central cross section (see FIG. 2) comprising a pair of parallel side plates 17 integrally connected at the bottom. The side plates 17 have outwardly-extending reinforcing ribs and flanges. The walking beam 11 extends through the composite bracket 16, being spaced from the sides 17 of the bracket as shown in FIG. 2.

An eye casting 19 (FIGS. 1 and 3) is secured to one end of the leaf spring 13, extending downwardly therefrom, and is received in a U-shaped eye housing 20 which is bolted to one end portion of a top of the composite bracket 16. A bolt 21 (FIG. 3) extending through the wall of the housing 20 and through the eye casting 19, connects the eye casting 19 and therewith the end of the leaf spring 13, with the housing 20, and consequently connects the spring end with the composite bracket 16. The bolt 21 carries a rubber bushing 22, and compression washers 23 enable the bushing 22 to be given longitudinal compression as desired.

The other or rear end of the spring 13 (FIG. 1) passes through another U-shaped housing 24 secured to the other end of the top portion of the composite bracket 16, the spring end being slidably held between suitable bearing members 25 and 26 carried by the housing 24. Thus the composite bracket 16 is connected with the leaf spring 13 in a well known manner so as to permit flexing of the leaf spring with the relative up and down movement of the walking beam 11 with respect to the composite bracket 16.

A transversely-extending trunnion shaft 27 (FIG. 2) is supported at its ends in the two composite brackets 16 at opposite sides of the vehicle. Each composite bracket is formed with a tubular bearing 28 at the bottom for the trunnion shaft, and a rubber bushing 29 is provided between the trunnion shaft and its bearing in each composite bracket. A compression cap 30 on each end of the trunnion shaft is held in position against the outer end of the corresponding bushing 29 by a compression rod 33 extending through the tubular trunnion shaft 27.

A support bracket or inboard leg 31 is secured to each side of the vehicle frame 10. The shape of this inboard leg will be apparent from FIGS. 1 and 2. The legs decrease in width downwardly, longitudinally with respect to the vehicle frame, and a trunnion shaft bearing member 32 for the trunnion shaft 27 is bolted to the bottom of each of these inboard legs 31. A spacer washer 33' (FIG. 2) is placed on the trunnion shaft between each bearing member 32 and the inner end of the adjacent rubber bushing 29.

Thus it will now be apparent that the shock transmitted from each walking beam in this improved tandem axle suspension will be transmitted first to the respective leaf spring 13, thence through the respective composite hanger-bracket 16 to the trunnion shaft, and finally from the trunnion shaft to the vehicle frame through the intermediary of the respective inboard leg 31 by which the vehicle frame is supported on the trunnion shaft. This indirect or roundabout connection between the walking beams and vehicle frame is in contrast to the common arrangement wherein the walking beams are mounted directly on the trunnion shaft and the vehicle frame is supported on the trunnion shaft by leaf springs. In the improved construction of the present invention the shocks transmitted from the walking beams not only must travel further in a more roundabout course in order to reach the vehicle frame, thus enabling a larger amount of the shock to be dissipated in the longer course of transmission, but also the cushioning of the shocks by the springs takes place at the beginning of this course through which they are transmitted, whereas in the common construction, as mentioned, the cushioning of the shocks occurs near the end of a shorter course. As a result it has been found that shorter leaf springs in this improved suspension will serve at least as effectively as the longer springs, common in the heretofore customary suspension, in securing the same final amount of shock reduction and absorption.

I claim:

1. A vehicle running gear assembly for tandem axle suspension including a walking beam at each side of the vehicle, tandem axles carried in the respective ends of said walking beams, a leaf spring mounted on the top of the central portion of each walking beam, a hanger-bracket suspended from the ends of each of said leaf springs, said hanger-brackets extending down below said walking beams respectively, a trunnion shaft supported at its ends in said hanger-brackets, a bearing for an end of said trunnion shaft in a lower portion of each hanger-bracket spaced below the center portion of the corresponding walking beam, and a pair of inboard legs for the vehicle frame mounted on said trunnion shaft and located slight distances inwardly from said hanger-brackets respectively.

2. A vehicle running gear assembly for tandem axle suspension comprising a solid walking beam at each side of the vehicle, tandem axles carried in the respective ends of said walking beams, a leaf spring secured to the top of the central portion of each walking beam, a hanger-bracket suspended from the ends of each of said leaf springs, each hanger-bracket having a pair of spaced side walls connected at the bottom, each walking beam extending through the related hanger-bracket spaced from the side walls of the hanger-bracket, a trunnion shaft supported at its ends in said hanger-brackets, a bearing for an end of said trunnion shaft in the lower portion of each hanger-bracket spaced below the center portion of the walking beam within the hanger-bracket, and a pair of supporting brackets for the vehicle frame mounted on said trunnion shaft and located slight distances inwardly from said first mentioned hanger-brackets respectively.

3. A vehicle running gear assembly for tandem axle suspension consisting of a solid walking beam at each side of the vehicle, tandem axles carried in the respective ends of said walking beams, a leaf spring clamped at its center on the top of a central portion of each walking beam, a composite hanger-bracket supported by each of said leaf springs, means on each hanger-bracket connecting the end portions of the top of the bracket with the corresponding ends of the related leaf spring, each hanger-bracket having a pair of spaced side walls connected at the bottom, each walking beam extending through the related hanger-bracket spaced from the side walls of the bracket, a trunnion shaft supported at its ends in said hanger-brackets, a bearing for an end of said trunnion shaft in the lower portion of each hanger-bracket spaced below the center portion of the walking beam within the hanger-bracket, a compressible bushing for said trunnion shaft in each bearing, means carried by said trunnion shaft for compressing said bushings in an axial direction, and a pair of supporting inboard legs for the vehicle frame supported on said trunnion shaft and located slight distances inwardly from said composite hanger-brackets respectively.

References Cited in the file of this patent

FOREIGN PATENTS

| | | |
|---|---|---|
| 60,205 | France | Apr. 7, 1954 |
| | (2nd add. to 977,343) | |
| 567,097 | Great Britain | Jan. 24, 1945 |